Sept. 15, 1970    J. H. WALKER    3,528,594

STRIP DISPENSING APPARATUS

Filed March 20, 1968    5 Sheets-Sheet 1

INVENTOR
JAMES H. WALKER
BY
ATTORNEYS

INVENTOR
JAMES H. WALKER
BY
ATTORNEYS

Sept. 15, 1970  J. H. WALKER  3,528,594

STRIP DISPENSING APPARATUS

Filed March 20, 1968  5 Sheets-Sheet 4

INVENTOR
JAMES H. WALKER

BY

ATTORNEYS

Sept. 15, 1970      J. H. WALKER      3,528,594

STRIP DISPENSING APPARATUS

Filed March 20, 1968      5 Sheets-Sheet 5

INVENTOR
JAMES H. WALKER
BY
ATTORNEYS

United States Patent Office 3,528,594
Patented Sept. 15, 1970

3,528,594
STRIP DISPENSING APPARATUS
James H. Walker, Los Angeles, Calif., assignor to Akra Stamp Machine Co., Inc., South El Monte, Calif., a corporation of California
Filed Mar. 20, 1968, Ser. No. 715,484
Int. Cl. B65h 17/22
U.S. Cl. 226—110     24 Claims

ABSTRACT OF THE DISCLOSURE

A machine for dispensing selected whole increments of strip material by manipulation of operator-controlled selector means. The machine employs several locks and positioning means including means for preventing retrograde movement of the selector means, lock means in the path of the operator's finger while approaching the end of a dispensing operation to arrest dispensing as the last whole increment of the strip is dispensed, and lock means responsive to a pulling force applied to the dispensed end of the strip to prevent dispensing additional strip material.

The overall design utilizes a minimum number of components formed in major part from molded thermoplastic material. The machine is readily adapted to dispense one or a plurality of strips from supply rolls arranged in axial alignment parallel to the front of the machine.

Lock means for the machine proper is operable between three different positions serving separate locking functions and a second or tamper-proof lock is accessible only from the interior of the normally locked machine and holds the machine anchored to fixed support means to safeguard against the pilferage and theft of the machine.

---

The present invention relates to strip dispensing machines and more particularly to an improved and simplified machine of this type particularly suitable for dispensing any selected whole number of increments from a supply of strip material in a positive and foolproof manner.

There are today a great variety of applications for machines designed to dispense a wide variety of whole increments of strip material from a supply source such as postage stamps, trading stamps, admission tickets, and the like. The continuous strip material for each of these applications is transversely perforated at intervals to facilitate severance. In all cases it is important that any selected number of increments be dispensed speedily, with accuracy and with positive assurance that a whole last increment be dispensed in each dispensing cycle. Equally important is suitable provision safeguarding against dispensing any additional amount of strip material in the process of severing the dispensed end of the strip, as well as means for anticipating the approach of the end of a dispensing cycle and positively stopping the operation at the precise proper point.

Other important objectives include the provision of a compact light machine yet sufficiently rugged to withstand abusive use by unskilled operators having no particular mechanical skill or aptitude. It is also important that proper safeguards be provided against pilferage, and access to interior components by unauthorized personnel. In addition, a commercially acceptable machine must be suited to servicing and recharging with new supplies of strip material quickly, without need for tools and with a minimum of instruction.

The foregoing and other important objectives are fully satisfied by the present invention embodying numerous unique features and innovations not previously available in this art. The housing proper is designed for tamperproof anchorage to a fixed support by spring latch means accessible only from the interior of the housing and access to which is possible only by an authorized person. The access cover for the housing supports one or more selectors each independently coupled by direct drive means to a separate strip feeding drum. The axes for the feed drums are offset laterally from but parallel to the axis of the selectors. Each of the latter is rotatable in a path traversed by means effective to anticipate the end of each dispensing cycle irrespective of its length and operable to lock the selector positively against further movement once it reaches the end of its travel for that dispensing cycle. A key-operated lock manipulated only by a person authorized to have the key is movable to three different positions one of which releases the machine for opening, another of which locks the machine closed but free to dispense strip material, and the third of which locks the machine both closed and inoperable.

It is therefore a primary object of the present invention to provide a new, improved high-reliability strip dispensing machine.

Another object of the invention is the provision of an inexpensive strip dispensing machine utilizing a minimum number of components most of which are formed from rugged thermoplastic molding compounded to withstand abusive use and to provide long service life.

Another object of the invention is the provision of simple lock means for anticipating the approach of a dispensing cycle and responsive thereto to arrest the dispensing operation at its precise end.

Another object of the invention is the provision of self resetting positive lock means for arresting movement of a dispensing cycle for strip material.

Another object of the invention is the provision of simple positive means responsive to tension applied to the dispensed end of strip material effective to arrest any tendency to dispense more strip material as an incident to detachment of the dispensed end.

Another object of the invention is the provision of an improved unique strip dispensing machine readily assembled from components in one of two different assemblies for dispensing either a single or multiple strips.

These and other more specific objects will appear upon reading the following specification and claims and upon considering in connection therewith the attached drawings to which they relate.

Referring now to the drawings in which a preferred embodiment of the invention is illustrated.

Referring more particularly to FIGS. 1 to 4, there is shown one preferred embodiment of the invention strip dispensing machine, designated generally 10, having a generally cup-shaped molded housing 11 normally closed across its open front face by a detachable panel 12. Normally, panel 12 and the dispensing mechanism carried thereby is locked in closed position by lock mechanism 13 mounted on panel 12 and operated by a removable key 14. Details of this lock will be described below.

The right hand side wall of housing 11 is provided with a narrow dispensing slot 15 through which the dispensed ends of strip material 16, 17 issues. The upper edges of slots 15 preferably are provided with sharp-edged severing means 18 to facilitate severing strips 16, 17 along the perforations 19.

SELECTORS AND OVERRUN PREVENTER LOCKS

Figure 1:
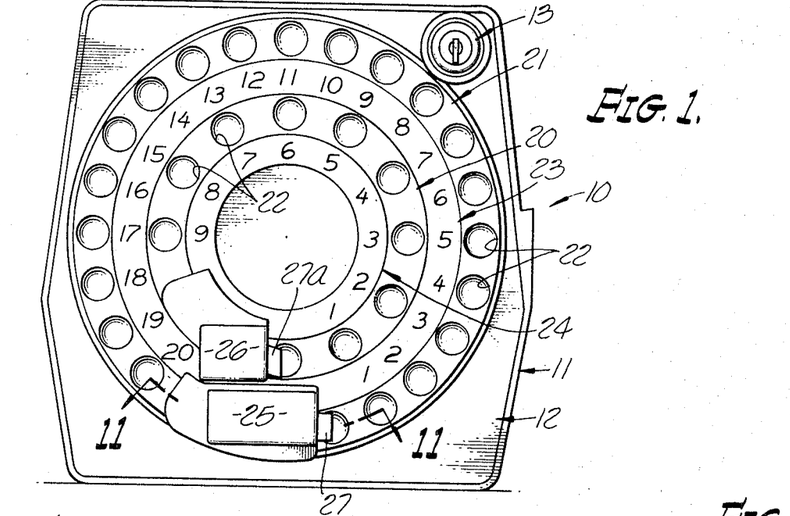
FIG. 1 is a front elevational view of a strip dispensing machine according to a preferred embodiment of the invention.

As shown in FIG. 1, machine 10 is provided with two independently operable selector rings 20, 21 each provided with a ring of semi-spherical fingertip seating recesses 22. The shouldered inner rim of the selector rings underlie and are held captive by the complementally shouldered edges of stationary rings 23, 24 each provided with a ring of symbols or digits, there being one for each of the fingertip seating recesses distributed counterclockwise from a respective stop 25, 26 fixed to panel 12. Each stop includes a principal portion overlying an associated selector ring.

Fixed stops 25, 26 comprise housings for stop mechanism safeguarding against overrun of the dialing operation serving to dispense one of the strips. This locking mechanism comprises two plastic members consisting of an actuatng button 27 and a locking dog 28. Dog 28 has a pair of trunnions 29 projecting from its opposite sides and extending crosswise of the interior of the channel-shaped actuator 27. These trunnions are held captive in aligned notches 30 formed in the side flanges of actuator 27.

Figure 11:
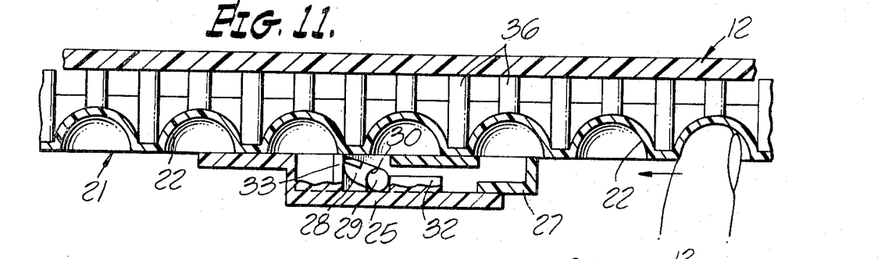
FIGS. 11 and 12 are fragmentary cross-sectional views taken generally along line 11—11 on FIG. 1 showing operating details of the lock means anticipating the end of a dispensing cycle, FIG. 11 showing the lock in extended released position and FIG. 12 showing the lock set to lock the selector ring against further clockwise movement.

Actuators 27 and 27a are held confined to a short reciprocating stroke by a boss 32 projecting inwardly from their respective housings 25, 26. The left hand of boss 32 limits travel of the actuator in one direction, as is made clear in FIG. 11. Clockwise rotation of selector ring 21 (indicated by the arrow on the operator's finger in FIG. 11) rotates recesses 22 past the free end of dog 28. If dog 28 should be in its upright locking position (see FIG. 12) at the start of a dispensing operation, initial movement of ring 21 to the left forces the dog to pivot counterclockwise and, in so doing, to act against the fixed upright surface of boss 33 to shift actuator 27 to its extended position as shown in FIG. 11. The engagement of the dog with the left end of fixed boss 32 prevents dog 28 from rotation through a full 90 degrees from the position shown in FIG. 11 and therefore leaves the dog properly postured for clockwise rotation to its upright locking position upon demand without need for biasing springs or reliance on gravity.

Figure 12:
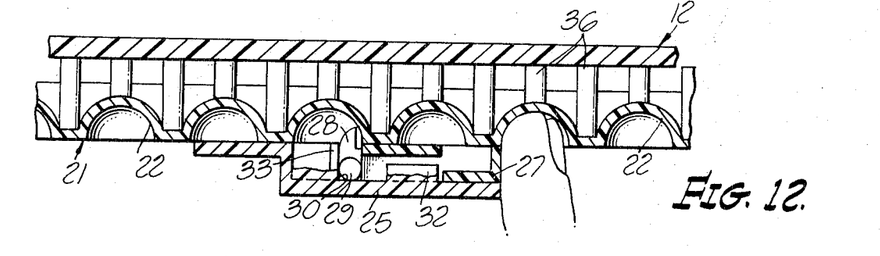

It is pointed out that boss 33 projects from the center interior portion of housing 25 and cooperates with the rounded nose end of dog 28 to cam the same to its upright position shown in FIG. 12 as the operator's finger strikes the projecting end of actuator 27 just before coming to rest against stop 25 at the end of a dispensing cycle. The tip of dog 28 then projects into one of the finger seating recesses 22 and locks the selector ring and the associated feed drum against further clockwise movement. The dog is held forcibly in locking position by the pressure of the operator's fingertip so long as applied to the right hand end of actuator 27. This locking condition exists precisely at the moment the selector ring dials the last full increment of the number of increments being dispensed during that cycle.

It will be understood that the described locking mechanism to prevent overrun of ring 21 is also employed on the smaller selector 22, the actuator button for that block being designated 27a.

Figures 12A, 13:
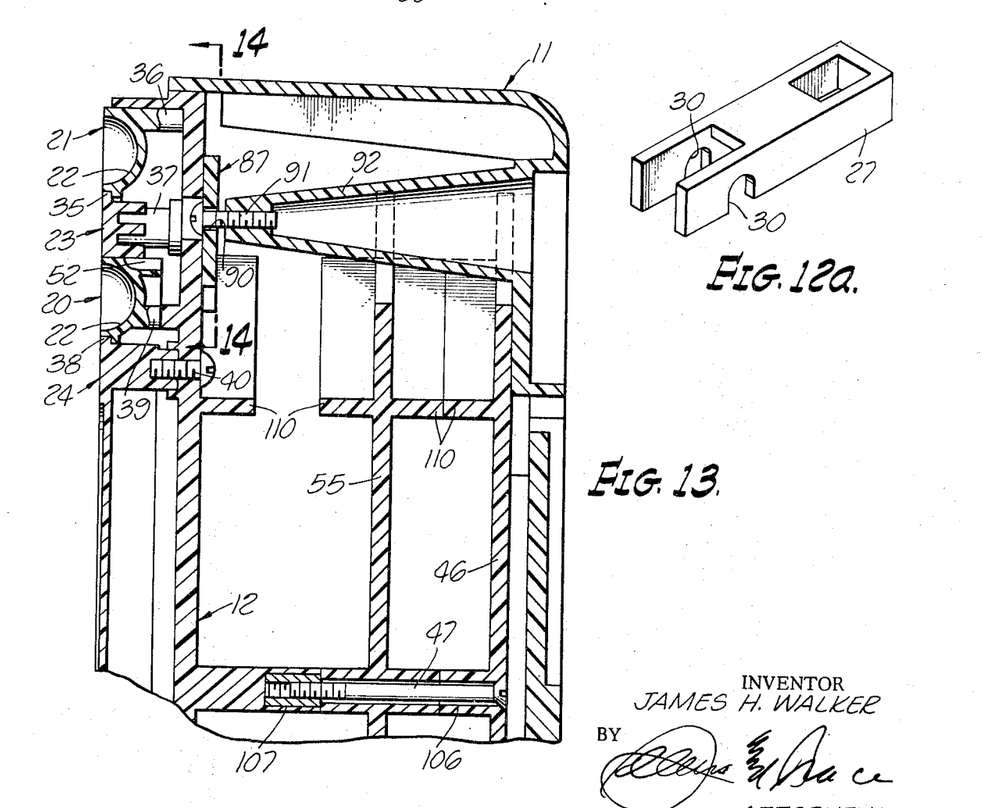
FIG. 12a is a perspective view of the actuator from the upwardly facing side thereof as viewed in FIG. 12.
FIG. 13 is a fragmentary sectional view taken along line 13—13 on FIG. 6 showing assembly details of the housing structure.

The manner in which selector rings 20, 21 are held assembled to panel 12 is best shown in FIG. 13. Thus, the indicia-carrying keeper ring 23 is provided with a flange 35 about its outer rim cooperating with a mating flange on the inner rim of selector ring 21 to hold the latter loosely journaled for rotation about its center with the inner ends of a ring or projection 36 bearing against the surface of the panel 12. Keeper ring 23 is held assembled to panel 12 through bosses 37 (FIG. 13) and assembly screws (not shown) threaded into these bosses. A smaller keeper disc 24 likewise has a flange 38 cooperating with an underlying flange of ring 20 effective to hold the latter loosely journaled with its ring of rearwardly-projecting cylindrical projections 39 bearing against an annular rib integral with panel 12. Disc 24 is held assembled to panel 12 by screws 40 (FIG. 13).

FEED DRUM MECHANISM

Figure 6:
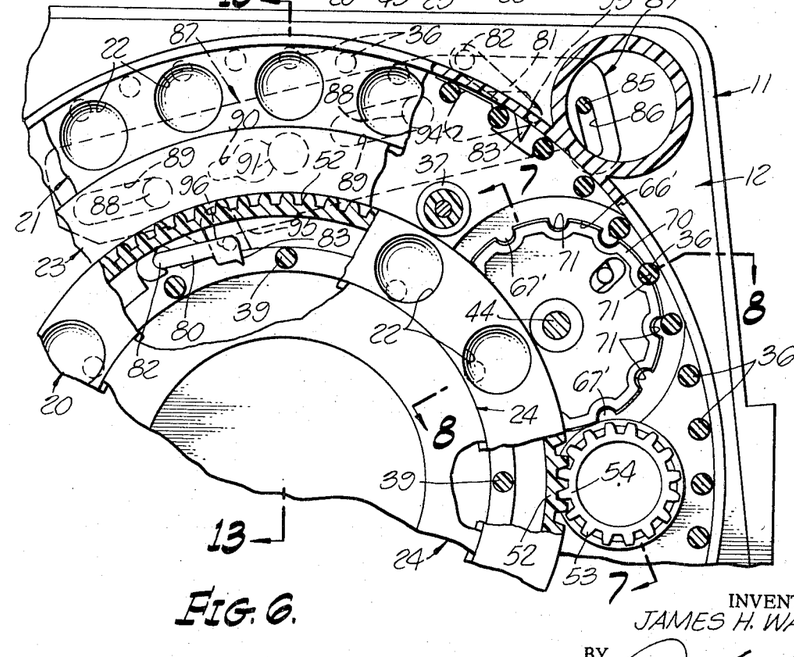
FIG. 6 is a fragmentary view, partly in elevation and partly in section, taken generally along line 6—6 on FIG. 8 showing details of the selector rings and their respective driving connections to a respective strip feed drum.
Figure 7:
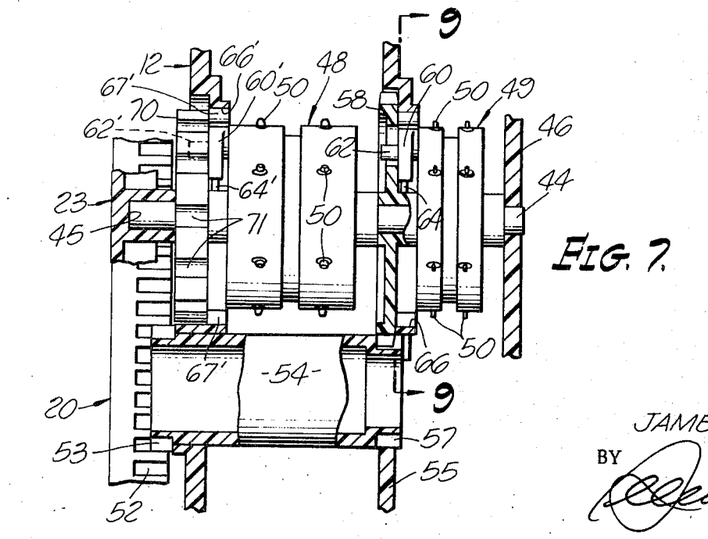
FIG. 7 is a cros-sectional view taken generally along line 7—7 on FIG. 6 showing the drive connection between the smaller selector ring and the associated feed drum.
Figure 8:
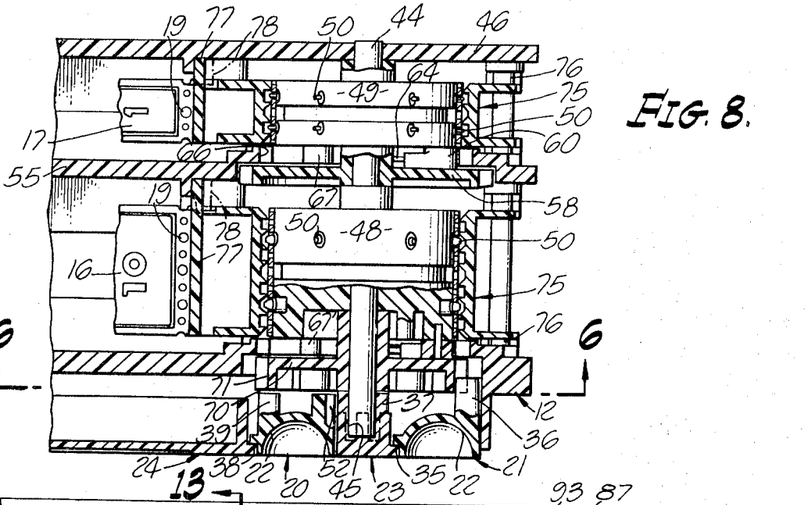
FIG. 8 is a view similar to FIG. 7 taken along line 8—8 on FIG. 6 showing the drive connection between the larger selector ring and its feed drum.
Figure 9:
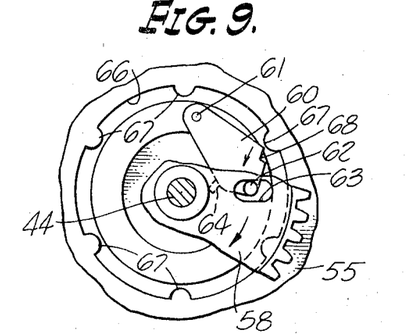
FIG. 9 is a fragmentary elevational view taken generally along line 9—9 on FIG. 7 showing the feed drum lock in relaxed nonlocking position.

The feed drum mechanism for discharging a desired number of increments of strip material from the machine will be best understood by a consideration of FIGS. 5 to 10. Referring first to FIG. 8, it will be seen that a shaft 44 has one end journaled in a socket 45 formed in keeper ring 23 and its other end journaled in a back plate 46 held assembled to panel 12 by screws 47 (FIG. 13). Loosely journaled on shaft 44 are two molded plastic feed drums 48, 49 each provided with low-height pins 50. Feed drum 48 is rotatable clockwise by selector ring 21 and feed drum 49 is similarly rotatable by selector ring 20. The drive connections between the feed drums and their respective selector rings will now be described.

Figure 5:
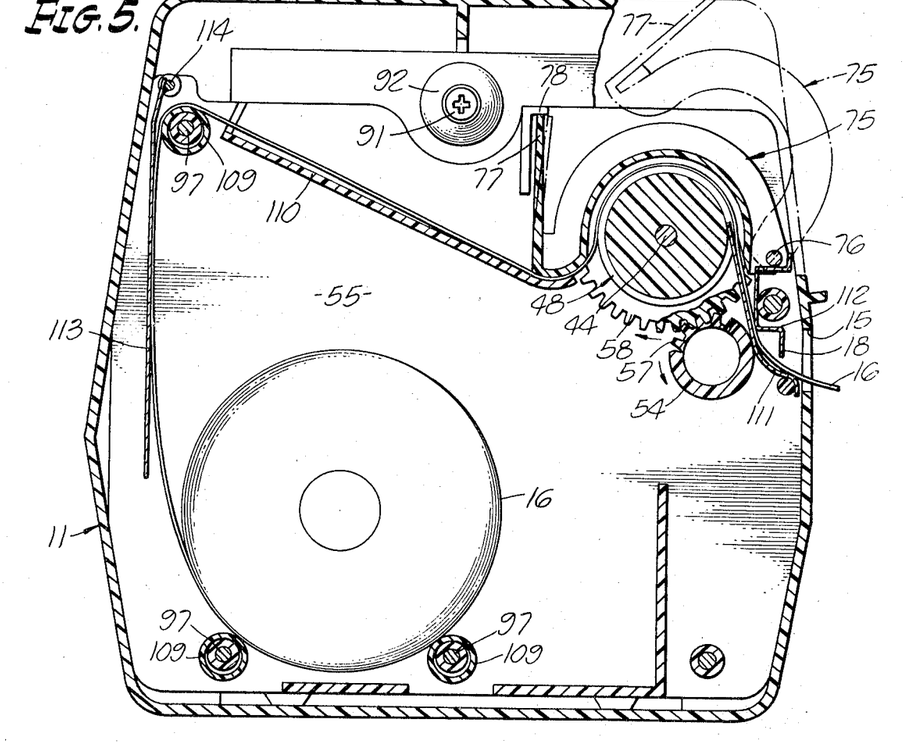
FIG. 5 is a cross-sectional view on enlarged scale taken along line 5—5 on FIG. 2 and containing a broken line showing of the feed drum guide shoe in both closed and open positions.

The driving connections between selector ring 20 and feed drum 49 will be described first by reference to FIGS. 5 to 10. Referring first to FIGS. 6 and 7 it will be noted that the interior periphery of selector ring 20 is formed with a ring of gear teeth 52 (FIG. 6) matable with the pinion teeth 53 of spool 54. The opposite ends of this spool are journaled in openings formed in panel 12 and in a divider panel 55 (FIG. 13) interposed between panel 12 and a back panel 46. Teeth 57 (FIG. 7) on the far end of spool 54 mate with the teeth of a disc 58 loosely mounted on shaft 44.

Disc 58 is spaced sufficiently from the adjacent end of feed drum 49 to accommodate a one way clutch mechanism interposed between feed drum 49 and the toothed disc 58. This clutch, best shown in FIGS. 9 and 10, comprises a dog 60 having one end pivotally connected by pin 61 to the end of feed drum 49. The other end of dog 60 is provided with an axial projection 62 extending into an elongated non-radial slot 63 in disc 58. A pin 64 projects from the inner edge of dog 60 and bears against the hub of disc 58 to limit the inward pivoting movement of the dog about pivot pin 61. Partition 55 lies in the general plane of the toothed disc 58 and is provided with a flanged opening 66 the larger diameter side wall of which is formed with rounded bosses 67 positioned to be engaged by notch 68 if a pulling force is applied to the dispensed end of the strip material. It will be understood that whenever the toothed disc 58 is being rotated clockwise (as viewed in FIG. 5) to dispense tape, the upper edge of slot 63 in the disc (FIG. 9) engages boss 62 on dog 60 and acts to rotate this dog inwardly toward shaft 44 about pin 61 thereby holding notch 68 disengaged from any one of bosses 67. Accordingly, under these circumstances rotation of disc 58 is effective to rotate feed drum 49 clockwise to dispense strip material.

Figure 10:
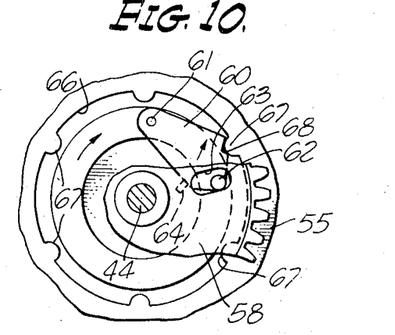
FIG. 10 is a view similar to FIG. 9 but showing the feed drum locked against rotation in response to tension applied to the dispensed strip end.

However, if a pulling force is applied to the dispensed end of the strip, this tension tends to rotate feed drum 49, whereupon the one way clutch dog 60 acts substantially instantly to lock the feed drum positively against clockwise rotation for reasons made apparent from the foregoing and a consideration of FIG. 10. Thus, a clockwise movement applied directly to feed drum 49 by the strip material carries boss 62 on dog 60 into contact with the lower edge of slot 63. This edge is inclined in a direction to cam the dog outwardly counterclockwise about pin 61 to seat notch 68 against stationary boss 67. Only very slight movement of the feed drum 49 is required to accomplish this locking action which continues so long as the pulling force is applied to the end of the strip. Immediately that the propelling force is applied to the feed drum through toothed disc 58 and the one-way clutch, however, the upper edge of slot 63 again becomes effective on boss 62 to cam dog 60 inwardly out of locking engagement with boss 67 and to hold it in this retracted, disengaged position so long as a dispensing force is being applied to selector ring 20.

A similar one-way clutch mechanism is likewise interposed between the lower end face of feed drum 48, as viewed in FIG. 8, and its driving disc 70 which is loosely journaled on shaft 44. Disc 70 has semi-circular notches 71 uniformly distributed about its periphery shaped and disposed to loosely seat cylindrical bosses 36 integral with the inner face of the larger diameter selector ring 21 in the manner best shown in FIGS. 6 and 8. The one-way clutch interposed between the adjacent faces of feed drum 48 and disc 70 is identical in construction and function with that just described in connection with feed drum 49. The locking dog of that clutch and driving disc 70 lie in the plane of an annularly flanged opening 66′ in panel 12. This opening is provided with bosses 67′ cooperating with a notch in the clutch dog in the same manner described above in connection with feed drum 49 to lock feed drum 48 against further dispensing movement if a pull is applied to strip 16 all without need for biasing springs or without reliance on gravity.

GUIDE SHOE FOR FEED DRUMS

It will be understood that a feature of the invention includes a one-piece arcuate guide shoe for holding the strip material releasably but firmly seated over pins 50 of the respective feed drums 48, 49. The combined guide shoe and latch for each drum is shown in FIGS. 5 and 8 and is there designated generally 75. The guide shoes for the two feed drums differ in width but not essentially otherwise. Accordingly, a description for one will suffice for both.

The full line showing of the shoe 75 in FIG. 5 represents the shoe in its operative closed position whereas the dot-and-dash line showing in the same figure represents the guide shoe partially open, an operation performed only after panel 12 and mechanism supported thereon is withdrawn from housing 11. Guide shoe 75 is channel-shaped in cross-section, one end being pivotally supported by pivot pin 76 and its opposite end being provided with an upright resilient locking tang 77 of molded plastic material integral with the main body of the shoe. Tang 77 is proportioned to hold the shoe firmly latched in closed position when its free end is positioned beneath detent 78 carried by the main frame as, for example, partition member 55. When latched closed, the guide shoes 75 hold strips 16, 17 loosely assembled over pins 50 on a respective one of the feed drums 48, 49. To release the shoe for servicing, inspection and insertion of a new supply of strip material, the operator merely presses tang 77 from beneath detent 78 and pivots the released shoe about pivot pin 76. After a new strip has been inserted over the top of the feed drum the shoe is pressed downwardly until tang 77 snaps beneath detent 78.

HOUSING AND SELECTOR RING LOCKED DEVICES

Additional locks for the invention mechanism include retrograde pawls for the selector rings, a housing and mechanism key-operated lock and a tamper-proof lock to prevent detachment of the machine from a support. These will be described in turn below.

Figure 14:
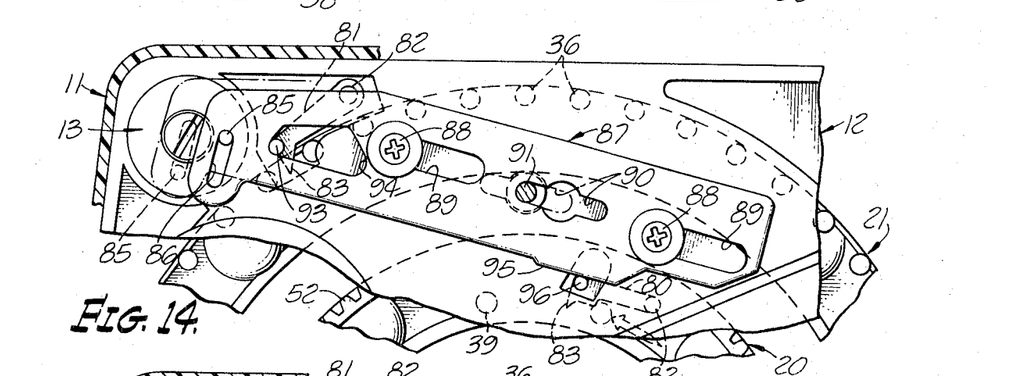
FIGS. 14 and 15 are fragmentary cross-sectional views taken along line 14—14 on FIG. 13 showing details of the means for locking the selector rings against retrograde movement and of the three-position key-operated lock.
Figure 15:
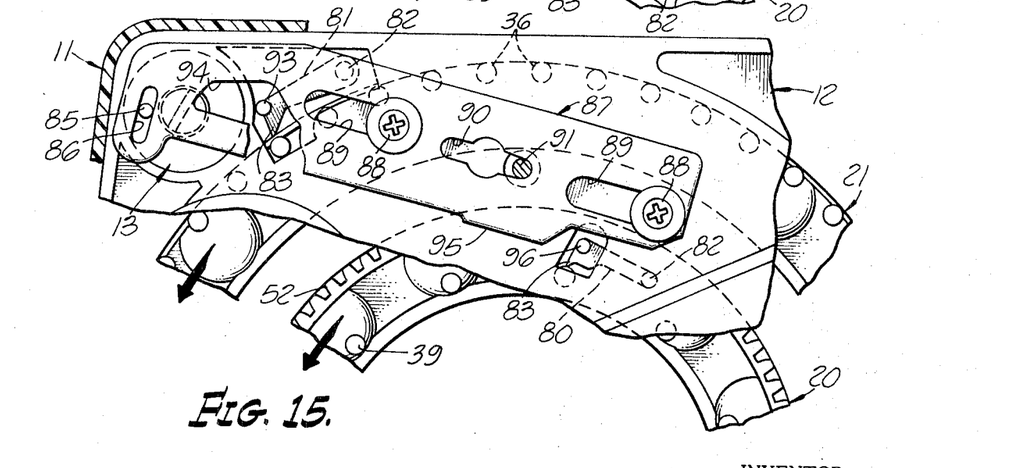

Referring to FIGS. 6, 14 and 15, there is shown separate retrograde locking pawls 80, 81 for each of the selector rings 20, 21. The pawls are generally similar to one another and have one end pivotally mounted to the mechanism frame at 82 and a toothed end 83 engageable with a respective one of the ring of projections 36, 39 carried by the rear face of the selector rings. The toothed ends are shaped and disposed to pivot the pawls out of locking position as the selector rings are rotated clockwise but fall into a position between projections 36, 39 and act to prevent retrograde or counterclockwise rotation of these rings for reasons readily apparent from FIG. 6.

The key-operated lock 13 (FIGS. 1, 2 and 3) as here shown, is securely anchored to the upper right hand corner of panel 12. A crank pin 85 projects rearwardly from a disc rotatable by key 14 and cooperates with a slot 86 extending crosswise of the left hand end of a locking bar 87 to shift this bar lengthwise thereof. This locking bar comprises a flat strip of thick metal held slidably supported against the rear face of panel 12 by shouldered screws 88 having their shanks extending through slots 89 in the locking bar. As will be apparent from the eccentric location of the crank pin 85 rotated by the key 14, the key and crank pin are effective to move the locking bar 87 from one extreme position shown in FIG. 14 to a second extreme position shown in FIG. 15.

The mid-portion of locking bar 87 is provided with a double keyhole slot 90 the center portion of which is large enough to fit over the head of screw 91 (FIG. 13) supported on the inner end of a post 92 integral with the rear wall of main housing 11. Accordingly, when the key-operated lock is midway between its two extreme positions the central portion of opening 90 is positioned to telescope freely over the head of screw 91 thereby permitting panel 12 and all operating parts of the dispensing mechanism to be telescoped into and out of its fully assembled position relative to housing 11.

Now let it be assumed that key 14 is rotated to shift bar 87 to the position shown in FIG. 14. In this position, panel 12 and the mechanism is locked assembled to the housing. Additionally, a boss 93 projecting from the toothed end of retrograde pawl 81 extends through an opening 94 in locking bar 87 which opening is so shaped as to hold boss 93 and pawl 81 against clockwise pivotal movement about pivot 82. Likewise the lower edge 95 of the locking bar overlies a similar boss 96 of retrograde pawl 80. It is therefore clear that, under these circumstances, neither pawl 80 nor 81 can pivot out of locking position relative to projections 39 and 36, respectively, of selector rings 20, 21 and it is impossible to rotate either selector ring or to dispense any strip material from the machine. It is therefore evident that the machine is locked against disassembly as well as against use to dispense any strip material.

If key 14 is rotated to its second extreme position illustrated in FIG. 15, the head of locking screw 91 is located in the other end of the double keyhole 90 thereby again locking the housing closed. However, boss 93 of retrograde pawl 81 is now in the center of opening 94 of the locking bar and pawl 81 is free to pivot as necessary to permit clockwise rotation of selector ring 21. Boss 96 on retrograde pawl 80 is likewise clear of edge 95 of the locking bar thereby leaving selector ring 20 free for clockwise rotation. It follows that the apparatus is locked closed but free for operation to dispense strip material. Only authorized persons having possession of key 14 can gain access to the interior of the machine.

Figure 2:
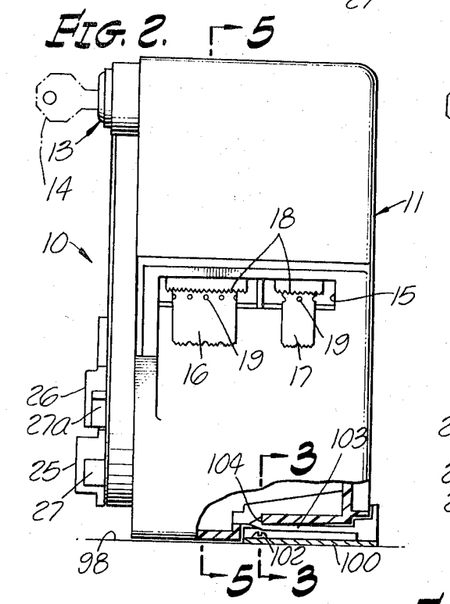
FIG. 2 is an end elevational view from the right hand side of FIG. 1 with a portion of the lower corner of the housing broken away to show details of the tamperproof mounting lock.
Figure 3:
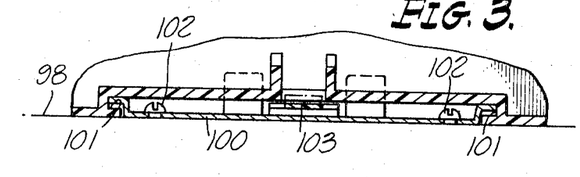
FIG. 3 is a cross-sectional view taken along line 3—3 on FIG. 2 to show the details of the tamper-proof lock.
Figure 4:
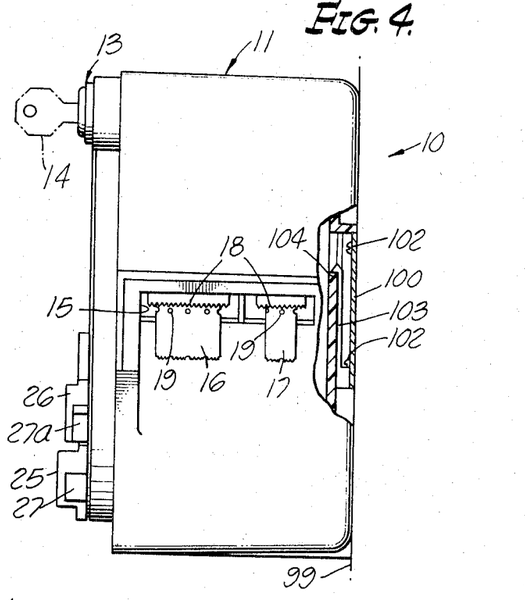
FIG. 4 is a view similar to FIG. 2 but showing the location of the tamper-proof lock arranged in the rear thereof suitable for securing the machine to an upright surface.

There remains to be described the tamper-proof locking mechanism for holding the housing of the machine detachably anchored to a supporting surface, such as a horizontal counter indicated at 98 in FIG. 2 and a vertical wall indicated at 99 in FIG. 4. As is best shown in FIG. 3, the machine is provided with a metal plate 100 flanged along either lateral edge to fit within grooves 101 formed in either the bottom or rear surface of housing 11. Plate 100 is anchored to a fixed support by screws 102. Suitably anchored to the exposed face of plate 100 is a resilient locking tang 103 the hooked end of which has a snug fit over the edge of a detent 104 integral with the interior of housing 11.

Housing 11 is assembled to the locking plate 100 by sliding it over the flanged edges of this plate until the hooked end of latch 103 snaps to its normal latching position across the edge of detent 104. The housing is now locked firmly against movement relative to mounting plate 100 and cannot be detached until the operator obtains access to the interior of the housing by removing panel 12 and then using his finger or a tool against the end to depress the hooked end of latch 103 out of locking engagement with detent 104 while at the same time applying pressure to withdraw the housing from plate 100.

Miscellaneous features will be best understood by reference ot FIGS. 5, 8 and 13. If it is desired to dispense only a single strip of material, then panel 55 may be omitted and the depth of housing 11 may be foreshortened so that the inner end of boss 106 carried by the rear wall fits directly against the inner end of boss 107 projecting rearwardly from panel 12. A shorter assembly screw 47 serves to hold the parts assembled. Likewise boss 92 crosswise of the upper portion of FIG. 13 is shortened correspondingly.

Referring to FIG. 5, it is pointed out that the interior lower portions of the housing cavity are available to store a supply of strip material. Supply coils rest by gravity on rollers 109 surrounding certain of the assembly screws 97 and the strip from each coil passes upwardly over another roller 109 and then along the upper side of a guard member 110 carried by one of the partition members. The curved forward end of this guard cooperates with the latch end of guide shoe 75 to feed the strip into registry with the pins 50 on one of the feed drums 49. A guard strip 111 suitably supports and cooperates with a guard 112 to provide a chute to deflect the dispensed end of the strip outwardly through discharge opening 15. The lower end of guide strip 112 is serrated to provide the tear-off means 18. A guard member 113 pivotally suspended from a support member 114 lies along the outer side of the strip material and aids in guiding it upwardly over roller 109. An important function of member 113 is to prevent bulging and collection of excess strip material in the compartment overlying guard 110 and along the adjacent edge of the storage compartment during re-assembly of the mechanism in the housing.

It will be understood that a second roll of strip material similar to 17 is provided in the storage compartment immediately rearward of front panel 12 and that it is guided into the entrance end of the guide shoe in the manner described in connection with strip 17.

OPERATION

It is believed that operation of the strip dispensing machine described herein will be readily apparent from the foregoing detailed description of its components and their operative relationship one to the other.

The machine is prepared for use by detaching panel 12 and the mechanism mounted thereon from housing 11. This is done by rotating key 14 to its intermediate position to align the head of locking screw 91 with the center of the double keyhole slot 90 (FIGS. 14 and 15), thereby permitting the mechanism to be withdrawn from the housing. Rolls of trading stamps, postage stamps or admission tickets are then assembled into each of the storage compartments and the free end of the strip is threaded over upper roller 109 (FIG. 5). Guide shoe 75 is unlatched by pressing tang 77 from beneath detent 78 (FIG. 5) thereby permitting the guide shoe to be pivoted clockwise about its pivot support at 76. The strip material is then passed over the top of the respective feed drums 48, 49 care being taken to register the perforations in the strip in registry over pins 50 before pressing the guide shoe closed with tang 77 latched beneath detent 78. Thereafter, the machine is reassembled into the housing and key 14 is rotated until locking bar 87 is positioned as shown in FIG. 15. Under these conditions, the head of screw 91 is located at the right hand end of slot 90 and each of the retrograde pawls 80, 81 are free to pivot out of the path of projections 36, 39 on each of selector rings 20, 21.

Let it be assumed the operator wishes to dispense seven increments of strip 16. This is done simply by inserting the tip of the index finger in depression 22 opposite digit 7 on the outer row 23 of the symbols. The operator then rotates the ring clockwise and, as the finger-tip approaches the terminal end of the cycle for dispensing the last portion of increment 7 of the strip, the finger will engage the right hand end of actuator button 27 and shift this button to the left from the position shown in FIG. 11 to the position shown in FIG. 12. As this action is taking place, locking dog 28 pivots to its upright position to engage the trailing inner edge of the adjacent recess 22. When so positioned, dog 28 is itself immovable and bars further clockwise movement of ring 21.

During the clockwise movement of ring 21, the ring of projections 36 extending inwardly from the rear face of ring 21 mesh with depressions 71 of disc 70 (FIGS. 6 and 8) to rotate this disc which acts through the one-way clutch 60 to rotate feed drum 48 clockwise as viewed in FIGS. 5 and 6 to dispense strip 16 through slot 15. As the last portion of increment 7 is dispensed the row of perforations extending crosswise of increment 7 are aligned with the teeth of severing blade 18 (FIG. 2).

The dispensed 7 increments are detached by grasping the free end of the strip and pulling it upwardly across the teeth of severing blade 18. Tension commonly applied to the strip in this severance operation cannot act to release any portion of the 8th increment of the strip owing to the locking action of one-way clutch 60' on feed drum 48 operating in the manner described in detail in foregoing portions of this specification.

Any possibility of retrograde rotation of feed drum is prevented owing to the locking action provided by pawls 80, 81, the free ends of which are normally positioned between a pair of the projections 36, 39. Accordingly, both the selector rings and the feed drums are continually locked against retrograde movement.

While the particular strip dispensing apparatus herein shown and disclosed in detail is fully capable of attaining the objects and providing the advantages hereinbefore stated, it is to be understood that it is merely illustrative of the presently preferred embodiments of the invention.

I claim:

1. A mechanism for dispensing any of a number of similar increments of strip material comprising, means supporting rotary selector means for rotation only in one direction toward a stop position, strip feed drum means arranged to be rotated by said selector means to dispense a selected whole number of strip increments from a supply of said strip material, and first lock means for arresting rotation of said selector means in a direction to dispense strip material comprising a movable member normally in an extended position with one portion thereof positioned in the path of the operator's finger and adapted to be moved thereby while dispensing the last selected increment of said strip to a retracted position, and pawl means mounted on said movable member and operable as the last selected increment of said strip is being dispensed to lock said selector means against further rotation to dispense additional strip material.

2. A machine as defined in claim 1 characterized in that said selector means has a ring of finger tip seats spaced one stamp increment apart and positioned for rotation past said stop position, and said first lock means including pawl means pivotable into one of said finger tip seats to lock said selector means positively against further dispensing movement as the operator's finger reaches said stop position with the last full increment of said strip material fully dispensed.

3. A machine as defined in claim 2 characterized in the provision of strip severing means extending crosswise of the dispensed portion of the strip and effective to sever an exact number of full increments of strip material from the main supply thereof.

4. A machine as defined in claim 1 characterized in the provision of second lock means responsive to a pull applied to the dispensed end of said strip while endeavoring to detach the dispensed increments of the strip operable to lock said feed drum means temporarily and positively against rotation.

5. A machine as defined in claim 4 characterized in that said second lock means comprises one-way clutch means responsive to a pulling force applied to the dispensed end of the strip material to hold the clutch means engaged so long as the pulling force is applied and automatically operable to the release position as the dispensed strip is severed.

6. A machine as defined in claim 1 characterized in that said selector means comprises a ring having a circular row of projections cooperating with drive coupling means interposed between said selector means and said feed drum means to drive the latter when said selector means is rotated in said one direction.

7. A machine as defined in claim 6 characterized in that said feed drum means is rotatable about an axis offset laterally from but parallel to the axis of said rotary selector means.

8. A machine as defined in claim 6 characterized in that said drive coupling means and said selector means includes mateable projections and seats on the respective ones of said means cooperating to advance said feed drum means simultaneously with the advance of said selector means.

9. A machine as defined in claim 8 characterized in that said mateable projections are integral with and project axially from the rear side of said selector means, and said projections being positioned to seat loosely in complementally shaped notches in the rim edge of said coupling means.

10. A machine as defined in claim 9 characterized in that said selector means, said drive coupling means, said first and second lock means, and said feed drum means are formed principally from molded thermoplastic material.

11. A machine as defined in claim 6 characterized in that said second lock means is located between said feed drum means and drive coupling means and is effective to impart forward driving movement to said feed drum means so long as said selector means is being advanced.

12. A machine as defined in claim 1 characterized in the provision of third lock means operable to prevent retrograde movement of said selector means but permitting free rotary movement thereof in a direction to dispense strip material.

13. A machine as defined in claim 12 characterized in that said third locking means comprises a gravity-actuated floating pawl cooperating with a ring of detent means arranged along the rear side of said selector ring means.

14. A machine for dispensing different numbers of whole increments of continuous strip material from a supply thereof, said machine having a front panel rotatably supporting a plurality of selector rings for rotation only in one direction, a plurality of independently operable strip feeding drums loosely supported on the rear side of said panel on a common shaft for rotation only in one direction, each of said selector rings having a ring of projections thereon mateable with complementally shaped separate rotary drive means coupled to a respective one of said strip feeding drums, and the axes of rotation of said separate drive means for said feed drum means being parallel and offset laterally from the axis of said selector rings.

15. A machine as defined in claim 14 characterized in that said selector rings, said feed drum means, and said separate drive means operatively connected between said drum means and a respective one of said selector rings are formed of molded thermoplastic material.

16. A machine as defined in claim 14 characterized in that one of said drive means comprises a unitary molded member comprising shaft means and a toothed ring integral with each end thereof, one of said toothed rings being mateable with the ring of projections on one of said selector rings and the other of said toothed rings being mateable with the complementally shaped peripheral portion of said feed drum means.

17. A machine as defined in claim 14 characterized in the provision of housing means for said machine closed except for an upright opening across the front side thereof sized to admit the components mounted on the rear side of said panel and to be closed thereby, and the side of said housing having dispensing slot means through which a dispensed end of strip material issues from either of said feed drum means.

18. A machine as defined in claim 17 characterized in the provision of a key-operated means concealed within said housing for locking said panel positively assembled.

19. In a strip dispensing machine of the type having a strip feeding means for dispensing a selected number of whole increments of strip material from a supply thereof and operatively connected to manually controlled selector means arranged to be moved through a path of an operator's finger, that improvement for preventing overrun movement of the selector means after arrival at a proper stop position to dispense the selected whole number of increments of said strip material which comprises normally extended lock actuator means positioned in the path of the operator's finger as it approaches the end of a dispensing operation of said selector means and movable by the operator's finger into a position abutting one of the operator's finger engaging means thereby positively locking said selector means against further movement in a strip dispensing direction as the last whole increment of that cycle is dispensed.

20. The combination defined in claim 19 characterized in that said selector means is provided with means engageable with the operator's finger to move the same in a direction to dispense strip material from said machine, said lock means being normally extended to overlap the path of the operator's finger while dispensing the last whole increment of strip material of a given dispensing cycle, and said lock means being movable into a position abutting one of the operator's finger engaging means to arrest further movement of said selector means as the last whole increment of that cycle is dispensed.

21. The combination defined in claim 19 characterized in the provision of dog means cooperable with a series of detent means on said selector means for preventing retrograde movement thereof while permitting unrestricted movement in a strip-dispensing direction.

22. The combination defined in claim 21 characterized in that said selector means comprises a rotary member having a ring of finger tip seating depressions therein, and wherein said locking means is movable into one of depressions to arrest further rotary movement of said selector means precisely as said selectorr means reaches a position to dispense the last whole increment of a selected length of strip material.

23. A machine for dispensing strip material in different numbers of whole increments thereof comprising frame means supporting strip increment selector means, rotary feed drum means for dispensing a selected number of increments of strip material from a continuous supply thereof, and drive means operatively coupling said selector means to said feed drum means including lock means for preventing retrograde movement of said selector means and including means responsive to tension applied to the dispensed end of said strip to lock feed drum means against rotation in a direction to dispense strip material.

24. A machine as defined in claim 23 characterized in that said drive coupling means is free of biasing means normally urging the same toward any particular position and being quickly responsive to a dispensing force applied to said selector means to drive said feed drum means and being quickly responsive to a pull applied to dispensed strip material to lock said feed drum means against rotation by the applied pull force.

References Cited
UNITED STATES PATENTS

| | | | |
|---|---|---|---|
| 2,712,442 | 7/1955 | Hanson | 226—132 X |
| 3,165,248 | 1/1965 | Jones | 226—135 X |
| 3,229,880 | 1/1966 | Arp | 226—109 |
| 3,266,693 | 8/1966 | Hughes | 226—129 |

RICHARD A. SCHUCHER, Primary Examiner

U.S. Cl. X.R.

226—132, 135